United States Patent
Behr et al.

(10) Patent No.: US 7,578,548 B2
(45) Date of Patent: Aug. 25, 2009

(54) ENGINE HOOD COMPRISING A PROTECTIVE DEVICE FOR PEDESTRIANS

(75) Inventors: Robert Behr, Ebersbach (DE); Martin Gruenbaum, Sindelfingen (DE); Dieter Lange, Magstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/540,194

(22) PCT Filed: Dec. 2, 2003

(86) PCT No.: PCT/EP03/13551

§ 371 (c)(1), (2), (4) Date: Apr. 7, 2006

(87) PCT Pub. No.: WO2004/056619

PCT Pub. Date: Aug. 7, 2004

(65) Prior Publication Data

US 2006/0220418 A1   Oct. 5, 2006

(30) Foreign Application Priority Data

Dec. 19, 2002 (DE) ................................. 102 59 591

(51) Int. Cl.
*B60J 11/00* (2006.01)
(52) U.S. Cl. ................................. 296/193.11; 180/69.2
(58) Field of Classification Search ............ 296/193.09, 296/193.11, 203.02; 180/69.2
See application file for complete search history.

(56) References Cited

U.S. PATENT DOCUMENTS

2004/0021342 A1 *  2/2004  Fujimoto ............... 296/193.11

FOREIGN PATENT DOCUMENTS

| DE | 44 37 986 | 4/1996 |
|----|----|----|
| DE | 296 01 143 U | 5/1996 |
| DE | 199 29 048 | 12/1999 |
| DE | 199 42 383 A1 | 3/2001 |
| EP | 1 093 980 | 4/2002 |
| EP | 1 357 018 | 10/2003 |
| JP | 05-139338 | 6/1993 |
| JP | 2003-308181 | 9/2003 |
| WO | WO 02/47961 | 6/2002 |

OTHER PUBLICATIONS

Seth Hutchinson, Greg Hager, Peter Corke, "A Tutorial on Visual Servo Control", May 14, 1996 as published in: IEEE Transactions on Robotics and Automation 12(5), Oct. 1996.
International Search Report of WP/2003/013551 (6 pages).

* cited by examiner

*Primary Examiner*—Lori L Lyjak
(74) *Attorney, Agent, or Firm*—Davidon, Davidson & Kappel, LLC

(57) ABSTRACT

An engine hood for motor vehicles has a deformable head impact zone to protect pedestrians in the event of a collision with the motor vehicle. The engine hood comprises an outer shell, which is formed by the body paneling, and an inner shell which is arranged below the outer shell and is connected to the outer shell. The inner shell is provided with a vault-structured stiffening region in the region of the head impact zone.

14 Claims, 2 Drawing Sheets

ENGINE HOOD COMPRISING A PROTECTIVE DEVICE FOR PEDESTRIANS

BACKGROUND

The invention is based on an engine hood for motor vehicles, which is provided with a deformable head impact zone to protect pedestrians in the event of a collision with the motor vehicle, as is known, for example, from EP 1 093 980 A1.

In the event of a pedestrian colliding with a vehicle, in particular in the event of a head-on impact, the upper body or head of the pedestrian often strikes the engine hood of the vehicle, which can cause serious injury to the pedestrian. To reduce this risk of injury, the region of potential impact of the pedestrian on the engine hood has to be as yielding and deformable as possible. However, there is only a very small amount of free space available between the engine hood and the equipment below it, and consequently the deformation movement by which the engine hood can yield in the event of a collision with a pedestrian is only very small. Furthermore, to protect the occupants of the vehicle in the event of a head-on collision, the engine hood has to satisfy requirements relating to component rigidity and has to be configured in such a way that defined deformation and therefore a controlled conversion of energy occur in the event of the engine hood crumpling in the longitudinal direction of the vehicle.

To satisfy these contradictory demands, the engine hood is in many cases configured as an assembly of an outer shell (which forms the body paneling) and a reinforcing shell, which is arranged below the outer shell and is provided with suitable deformation and stiffening elements. The generic EP 1 093 980 A1 has disclosed, for example, an engine hood with an outer shell and a reinforcing shell, the flexural rigidity of which varies over the engine hood in such a way that the engine hood has a relatively high flexural rigidity in the center but a lower flexural rigidity in the edge regions. This design is intended to ensure that in the event of a central head impact, the entire mass of the engine hood counteracts the impact, whereas in the event of a head impact in the edge regions, the energy of the head impact is dissipated over a small part of the engine hood. The design of the engine hood which is known from EP 1 093 980 A1 therefore aims to achieve an approximately constant deformation of the engine hood irrespective of the impact site.

However, current knowledge has shown that when assessing the effects of a collision of a pedestrian with the engine hood, it is not only the bending of the engine hood but also, to a much greater extent, the acceleration or deceleration of the impacting body, i.e. the forces acting on the body, which play an important role. In addition, as before, the maximum possible free space has to be available between engine hood and the equipment below it, so that in the event of a collision with a pedestrian, the engine hood can yield by the largest possible deformation movement before it comes into contact with the (generally very hard) equipment below it.

SUMMARY OF THE INVENTION

An object of the present invention is to provide an the engine hood that provides a substantially homogeneous force level over the engine hood in the event of pedestrians colliding with the vehicle. A further or alternate object of the invention—given a predetermined form of the engine block and the outer paneling—is to provide a substantially large deformation movement by which the engine hood can yield in the event of a pedestrian colliding with the vehicle without hitting the engine block.

The present invention provides an engine hood for motor vehicles which has a deformable head impact zone to protect pedestrians in the event of a collision with the motor vehicle. The engine hood includes an outer shell, which is formed by the body paneling, and at least one inner shell, which is arranged below the outer shell and is connected to the outer shell, characterized in that the inner shell has a stiffening region which is provided with a vaulted structure. The vaulted structure is being formed by local folding with only an insignificant increase in the surface area of the material.

Accordingly, the engine hood is configured as a composite part made up of an inner shell and an outer shell, the inner shell being provided with a stiffening region which has a vaulted structuring. A "vault-structured" component region in this context is to be understood as meaning a component region which has been provided with a stiffening macrostructure which has been introduced into the semi-finished product used to produce the component with the aid of a bulging process. The process used to produce bulge-structured semi-finished products of this type is described, for example, in DE 44 37 986 A1.

Unlike when using conventional deformation processes (such as for example embossing or hydroforming), in which the starting material is plasticized during forming, in the case of vault-structuring the semi-finished product is merely folded locally; this process is associated with only an insignificant increase in the surface area of the material. The bulge-forming is effected in a continuous process, so that entire webs of material (or band-like regions on them) are provided with the vaulted structure.

To produce the inner shell of the engine hood, a blank is cut out of the vault-structured web of material and is then shaped into the inner shell by further process steps. Alternatively, an insert part, the size and shape of which are matched to the stiffening region of the inner shell, can be cut out of the vault-structured semi-finished product; in a further process step, this insert part is fitted into a cutout provided for this purpose in the inner shell, which is formed conventionally (e.g. by deep-drawing) from an unstructured metal sheet, and connected to the inner shell.

The vault-structuring is associated with a considerable increase in the rigidity of the associated semi-finished product and the component produced therefrom. Unlike in the procedure which is known (for example from EP 1 093 980 A1) of providing the inner shell with beads which increase the rigidity, vault-structuring has the advantage of effecting an increase in rigidity which is substantially direction-independent. Therefore, a vault-structured stiffening region of the inner shell, which spans the majority of the impact region, can achieve a virtually direction-independent, constant rigidity and mass distribution of the inner shell in the impact region. This ensures a homogeneous force level or energy absorption capacity over the whole of the vault-structured region of the engine hood.

In the event of a crash, vault-structured components are distinguished by a high energy absorption and a regular, reproducible deformation. This plays an important role in protecting the vehicle occupants in the event of a head-on collision, since the inventive configuration of the inner shell with vault-structured deformation region allows well-defined crumpling of the engine hood in the longitudinal direction of the vehicle and therefore a controlled conversion of energy.

A further advantage of the invention consists in the fact that the bulges which are introduced into a web of material during the vault-structuring have a very low height compared to the beads which are stamped in in the conventional way. The result of this is that the effective component thickness of the vault-structured stiffening region of the engine hood inner shell is significantly lower than the effective component thickness of conventional beaded inner shells. This saving on the effective component thickness means that the inner shell according to the invention takes up significantly less space than conventional inner shells, so that a larger free space remains between the engine block and the paneling (outer shell) of the engine hood; this free space can be used as deformation movement for the engine hood in the event of a pedestrian colliding with the vehicle.

To summarize, the configuration of the engine hood according to the invention with an inner shell which is vault-structured in regions therefore produces significant advantages over a conventional beaded inner shell, namely:
- a very homogeneous force level and therefore a very homogeneous energy absorption capacity in the vault-structured region of the engine hood, and
- a low effective thickness of the inner shell in the region of the engine block and therefore a greater free deformation movement of the engine hood in the event of a collision.

The vault-structured stiffening region expediently spans the whole of the central region of the inner shell which is located above the equipment in the engine compartment in the vehicle over a large surface area. Along the side regions and in the front region, where additional reinforcements to the inner shell have to be provided for the hinges or brackets, the inner shell has, instead of the (direction-independent) vaulted structuring, a targeted stiffening structure which is matched to the mating brackets on the body and is reinforced by additional elements.

According to an advantageous configuration of the invention, the stiffening region of the inner shell is formed by an approximately planar vault-structured insert part, which is produced separately from a vault-structured semi-finished product and during bodyshell assembly is fitted into a cutout in the inner shell (which has been produced, for example, by deep-drawing) and fixedly connected to the latter. This structure of the inner shell is particularly expedient with regard to deformation technology aspects, since the vault-structured insert part can be manufactured separately and only a small amount of smoothing or deformation of the vaulted structure is required.

To allow easy attaching of the insert part to the inner shell with the aid of conventional, tried-and-tested processes which are suitable for large-scale series production—e.g. by spot welding and/or adhesive bonding—and thereby to enable a high-strength join to be ensured in a reliable way, the vaulted structure is advantageously smoothed in the edge region of the insert part. This produces a smoothed flange at the edge of the insert part, which in the position in which the insert part is to be assembled with the inner shell comes to bear against a correspondingly shaped flange on the inner shell and is connected to the latter by a joining process, preferably by adhesive bonding. The smoothing of the edge regions of the insert part is carried out in a particularly cost-effective way with the aid of a stamping process.

The vault-structuring of the stiffening region on the inner shell is advantageously oriented in such a way that the bulges are vaulted upward, i.e. toward the outer shell. To achieve a particularly homogeneous rigidity and strength of the engine hood in the impact region, the upwardly protruding domes of the bulges are expediently adhesively bonded to the outer shell.

BRIEF DESCRIPTION OF THE DRAWINGS

The following text provides a more detailed explanation of the invention on the basis of an exemplary embodiment illustrated in the drawings, in which.

DETAILED DESCRIPTION

Figure 1:
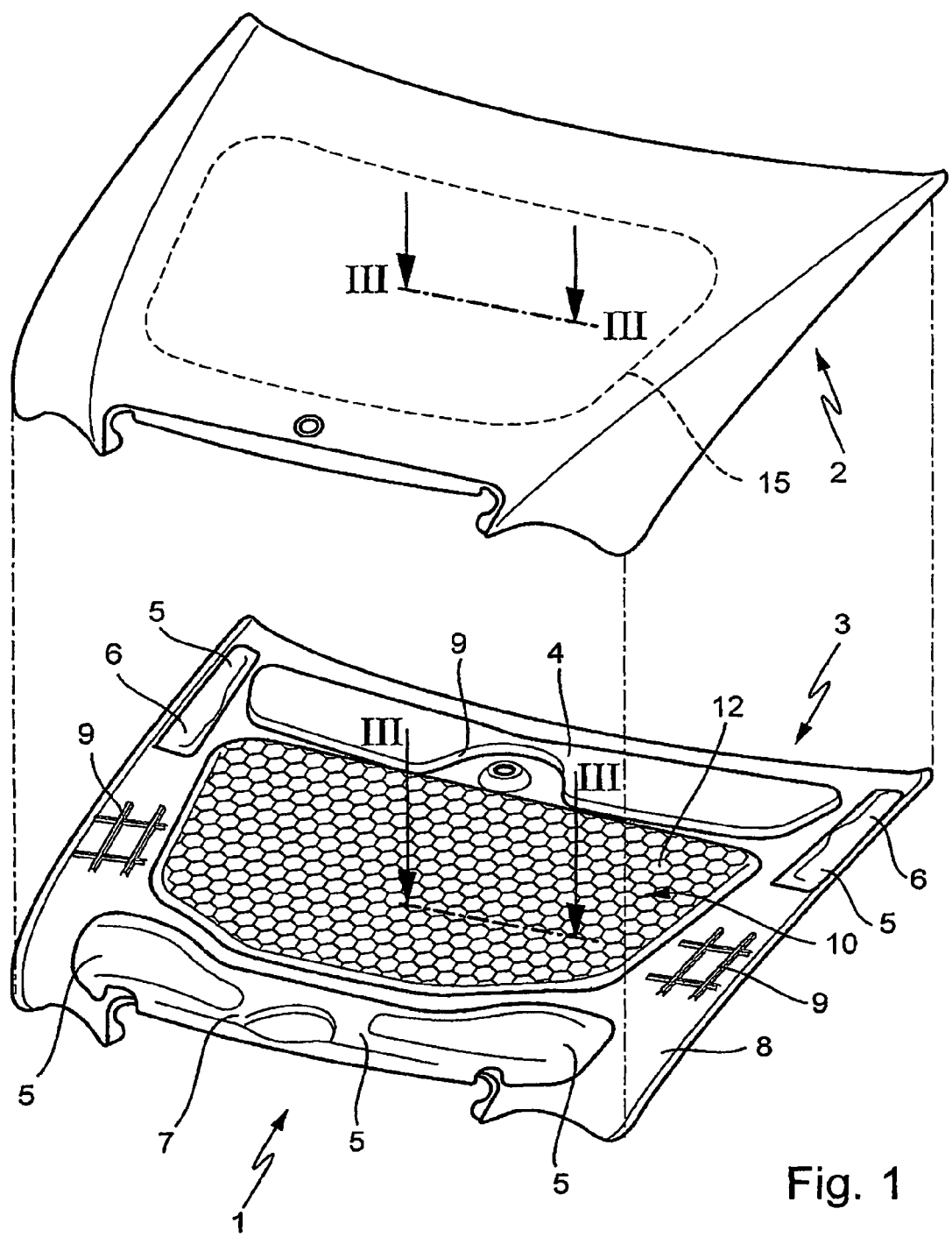
FIG. 1 shows an exploded view of an engine hood according to the invention.

FIG. 1 shows an exploded illustration of an engine hood 1 with an outer shell 2 which has been reinforced by an inner shell 3. In the present example, both shells 2, 3 consist of sheet metal; however, they may in general also be made partly or completely from other materials, in particular from fiber-reinforced plastics.

Figure 2:
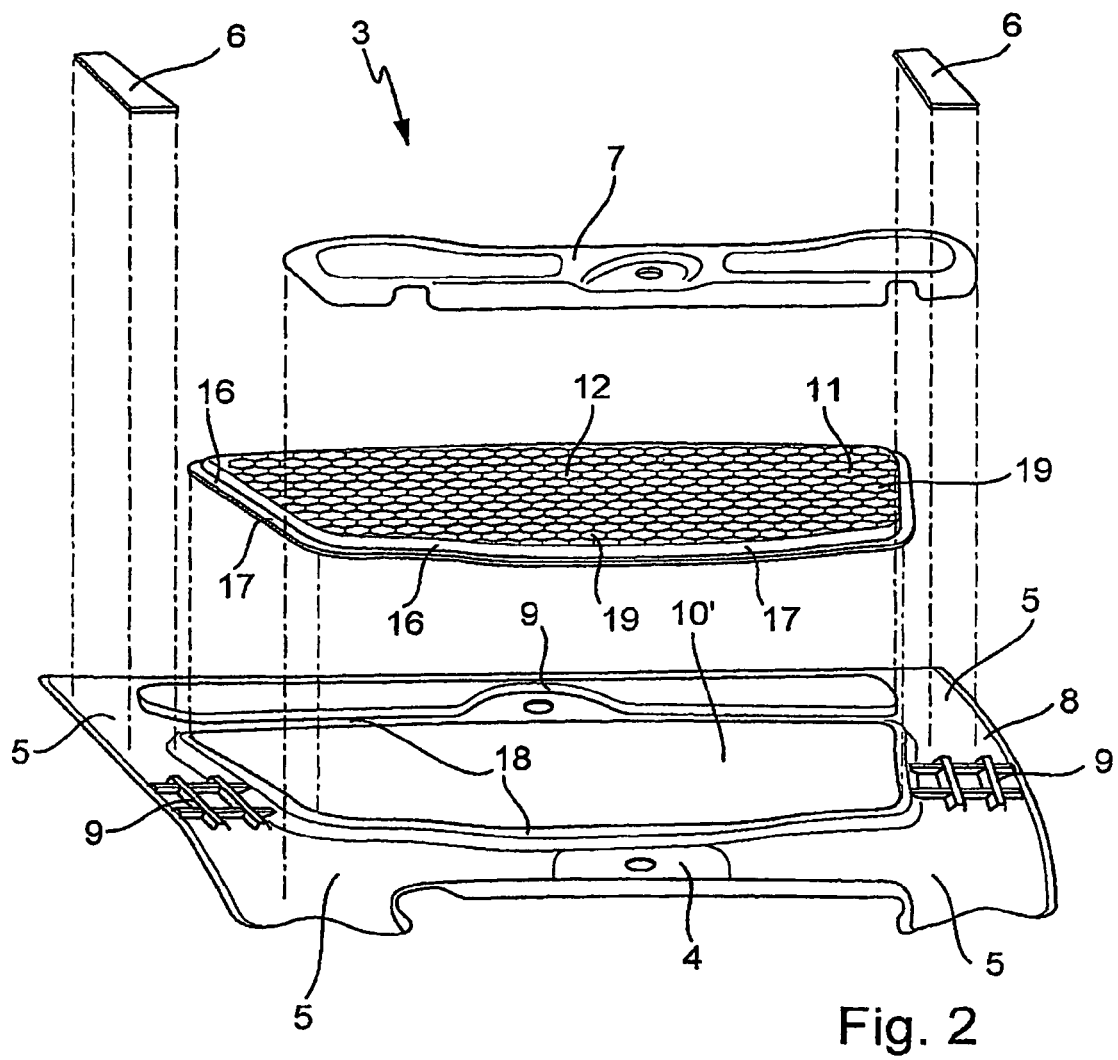
FIG. 2 shows an exploded view of the inner shell of the engine hood shown in FIG. 1.

The outer shell 2 is a deep-drawn metal sheet which is connected to the inner shell 3 as part of the bodyshell assembly. The inner shell 3 is a composite component and comprises—as can be seen from the exploded illustration presented in FIG. 2—a base part 4, which is reinforced in the bracket regions 5 by additional metal reinforcing sheets, namely the hinge reinforcements 6 and the front metal stiffening sheet 7. The base part 4 and the reinforcing parts 6, 7 are typically deep-drawn parts formed from sheet metal (steel, aluminum). In the bracket regions 5 and the edge regions 8, the base part 4 is stiffened by beads 9. Furthermore, a stiffening region 10, which covers the majority of the engine compartment 25 located below the engine hood 1 in the vehicle, is provided in the interior of the inner shell 3. In this stiffening region 10, the base part 4 has a cutout 10', into which an insert part 11 is secured using an adhesive bonding process. The macro-geometry of the insert part 11 is—as can be seen from FIGS. 1 and 2—approximately planar, allowing a flat shape of the engine hood 1 to be achieved.

The insert part 11 is produced from a vault-structured blank of sheet metal. The vaulted structure 12 on the blank is produced with the aid of a bulging process, which is described in detail, for example, in DE 44 37 986 A1; this bulging process produces a vault-structured insert part blank from a planar metal starting sheet. Since the vaulted structure 12 is introduced in a continuous process, the insert part blank has the vaulted structuring 12 over its entire surface. Alternatively, the starting material used for production of the insert part 11 may also be a blank which—instead of being fully vault-structured—is provided with a vaulted structuring only in a central band-like strip (corresponding to the direction of advance of the bulging process), whereas the adjacent edge strips are devoid of vaulted structures.

The vaulted structure 12 of the insert part 11 in the present exemplary embodiment has a hexagonal symmetry, which is diagrammatically indicated in FIG. 1 by a honeycomb pattern. The grid or lattice constant 13 and the vault height 14 of the vaulted structure 12 are in this case matched to the material thickness and the desired increase in rigidity of the insert part 11. The optimum shape and orientation of the vaulted structure 12 on the insert part 11 is advantageously determined in numerical strength tests and crash simulations carried out on the engine hood 1. As an alternative to the hexagonal vaulted structure 12 shown, the insert part 11 may also have a vaulted structure with a triangular or rectangular basic symmetry. Since the vaulted structure 12 of the insert part 11 is highly symmetrical (in the form of a regular hexagonal grid in the case of FIGS. 1 and 2), this vaulted structure 12 has an approximately direction-independent stiffening effect on the insert part 11. Therefore, a constant, predetermined force loading or deceleration in the event of a test body striking the engine hood 1 can be achieved in different test zones in the area of the impact region 15 which is covered by the insert part 11 (and indicated by dashed lines in FIG. 1). At the same time, the engine hood 1 has a homogeneous area moment of inertia over the impact region 15.

Along its edge 16, the insert part 11 is provided with connection zones 17, which are substantially devoid of vaulted structures 12 and are in the form of flat flanges. In these connection zones 17, the vaulted structure 12 which was originally present on the insert part blank has been smoothed by a stamping process. The connection zones 17 are configured in such a way that the insert part 11 can be attached to the base part 4 with the aid of conventional joining processes (preferably by adhesive bonding, or alternatively, by way of example, by spot-welding); the base part 4 is likewise approximately flat in the region of overlap with the connection zones 17.

Beads (not shown in FIGS. 1 and 2) may be provided on the insert part 11 in a transition region 19 between connection zones 17 and vaulted structure 12; these beads serve to "consume" the excess material which has been formed as a result of the increase in surface area during the vault-structuring and now has to be removed in a controlled way during smoothing of the connection zones 17 of the insert part 11. The beads are dimensioned and arranged in such a way that on the one hand they prevent creases from forming in the smoothed connection zone 17 and on the other hand prevent smooth material from being pushed into the vaulted structure 12 of the insert part 11.

Figure 3:
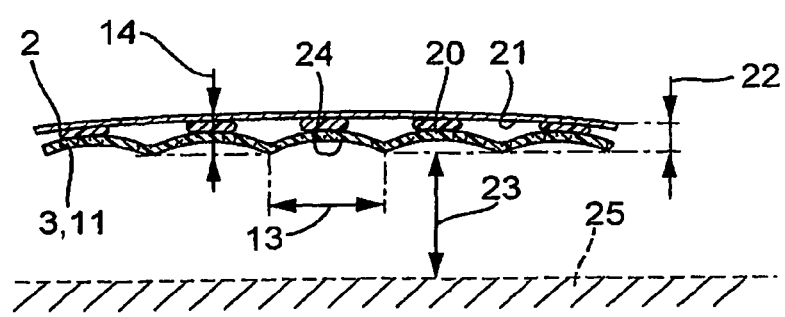
FIG. 3 shows a diagrammatic sectional illustration through an assembly of outer shell and inner shell, in accordance with section III-III in FIG. 1.

After the reinforcing parts 6, 7 and the insert part 11 have been joined to the base part 4, the inner shell 3 produced in this way is joined to the outer shell 2 to form the engine hood 1. To securely join the vault-structured insert part 11 to the outer shell 2, the upwardly projecting bulge domes 20 of the vaulted structure 12 of the insert part 11 are adhesively bonded to the opposite inner side 21 of the outer shell 2. As can be seen from FIG. 3, a sheet-metal composite, the effective thickness 22 of which is determined by the sheet-metal thicknesses of the outer shell 2 and of the insert part 11 and by the vault height 14 of the vaulted structure 12, is then formed in the region of the insert part 11. Since the vaulted structuring has a very low vault height 14—compared to a beaded arrangement which is customarily used—the effective thickness 22 of the engine hood 1 is also significantly lower in this impact region 15 than in the case of the conventional engine hoods which are stiffened by beads: for example, in the case of metal sheets which are between 0.7 mm and 1.2 mm thick, as are typically used for the inner shell 3, the bulges, for honeycomb sizes of 25-50 mm, protrude only approximately 2-4 mm out of the web of material. The result of this is that the effective clear height 23 which is left between the inner side 24 of the engine hood 1 and the equipment 25 of the engine block (which is indicated by dashed lines in FIG. 3) is significantly greater throughout than if a conventional beaded engine hood is used. This increase in clear height 23 leads to an increase in the deformation movement which the engine hood 1 has to cover in the event of a collision with a pedestrian before the engine hood 1 strikes the equipment 25. Consequently, the engine hood 1 according to the invention, with an inner shell 3 which has been vault-structured in regions, on the one hand offers a particularly homogeneous force loading over the impact region 15, and on the other hand—given a predetermined arrangement of the engine compartment equipment 25 and the outer skin 2 of the engine hood 1—allows a particularly large free deformation movement 23. Therefore, the pedestrian can be better protected in the event of impact on the vehicle by the configuration of the engine hood 1 according to the invention.

In addition to the configuration of the inner shell 3 described above as an assembly of a deep-drawn base part 4 and a vault-structured insert part 11, the inner shell 3 may also be produced entirely from a vault-structured blank, which has been suitably smoothed and provided with strength-increasing beads 9 in the region of the bracket regions 5 and of the edges 8 (using a deep-drawing process). Although this configuration of the inner shell 3 eliminates the process step of adhesively bonding the (separately produced) insert part in place, the large-area smoothing and deformation of a vault-structured metal sheet—as described for example in patent application 102 15 12.2-14—imposes high demands on the configuration of the drawing tool, and consequently the production of the inner shell as a single-part component from a vault-structured metal sheet is associated with increased outlay on deep-drawing equipment.

What is claimed is:

1. An engine hood for a motor vehicle having a deformable head impact zone to protect pedestrians in the event of a collision with the motor vehicle, the engine hood comprising:
   an outer shell formed by a paneling of a body of the vehicle;
   at least one inner shell disposed below the outer shell and connected to the outer shell, the inner shell having a stiffening region, wherein the stiffening region includes a vaulted structure including a grid of bulges formed by local folding of a material of the inner shell so as to insignificantly increase the surface area of the material.

2. The engine hood as recited in claim 1, wherein the inner shell includes a base part defining a cutout and an insert part disposed in the cutout and fixedly connected to the base part, and wherein the stiffening region is formed by the insert part.

3. The engine hood as recited in claim 2, wherein the insert part includes a semi-finished product having a smooth edge region and a vault-structured portion.

4. The engine hood as recited in claim 2, wherein the insert part includes an edge region and is adhesively bonded to the base part at the edge region.

5. The engine hood as recited in claim 1, wherein the vaulted structure defines a plurality of bulge domes vaulted out in a direction toward the outer shell.

6. The engine hood as recited in claim 5, wherein the plurality of bulge domes of the vaulted structure are adhesively bonded to the outer shell.

7. The engine hood as recited in claim 1 wherein the inner shell is between 0.7 mm and 1.2 mm thick.

8. The engine hood as recited in claim 1 wherein the bulges protrude more than 2 mm.

9. The engine hood as recited in claim 1 the vaulted structure includes a honeycomb structure with honeycomb sizes of 25 to 50 mm.

10. The engine hood as recited in claim 1 wherein the vaulted structure includes hexagonal structures.

11. The engine hood as recited in claim 1 wherein the vaulted structure includes triangular or rectangular structures.

12. The engine hood as recited in claim 1 wherein the vaulted structure includes bulges protruding less than 4 mm.

13. An engine hood for a motor vehicle having a deformable head impact zone to protect pedestrians in the event of a collision with the motor vehicle, the engine hood comprising:

an outer shell formed by a paneling of a body of the vehicle;

at least one inner shell disposed below the outer shell and connected to the outer shell, the inner shell having a stiffening region, wherein the stiffening region includes a vaulted structure including local folding of a material of the inner shell so as to insignificantly increase the surface area of the material, the vaulted structure having a grid or lattice constant and vault height matched to a material thickness and desired rigidity of the inner shell.

14. A method for manufacturing the engine hood as recited in claim 1 comprising: creating the vaulted structure in a continuous web process.

* * * * *